United States Patent
Moroo et al.

(10) Patent No.: US 7,430,326 B2
(45) Date of Patent: Sep. 30, 2008

(54) IMAGE ENCODING APPARATUS, METHOD AND PROGRAM

(75) Inventors: Jun Moroo, Kawasaki (JP); Tsugio Noda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 816 days.

(21) Appl. No.: 10/642,142

(22) Filed: Aug. 18, 2003

(65) Prior Publication Data

US 2004/0042670 A1 Mar. 4, 2004

(30) Foreign Application Priority Data

Aug. 30, 2002 (JP) .............................. 2002-254164

(51) Int. Cl.
*G06K 9/36* (2006.01)
*G06K 9/46* (2006.01)
*H04N 1/46* (2006.01)

(52) U.S. Cl. .................................. 382/232; 382/248
(58) Field of Classification Search ................ 382/100, 382/232, 248, 249, 250; 358/539
See application file for complete search history.

(56) References Cited

U.S. PATENT DOCUMENTS

| 5,636,292 | A | 6/1997 | Rhoads | |
|---|---|---|---|---|
| 6,304,606 | B1* | 10/2001 | Murashita et al. | 375/240.24 |
| 6,546,144 | B1* | 4/2003 | Fukuhara et al. | 382/240 |
| 7,076,097 | B2* | 7/2006 | Kondo et al. | 382/190 |
| 2005/0259877 | A1* | 11/2005 | Wang et al. | 382/236 |

FOREIGN PATENT DOCUMENTS

| JP | 2-16683 | 1/1990 |
|---|---|---|
| JP | 9-97303 | 4/1997 |
| JP | 2000101979 | 4/2000 |
| JP | 2002-082855 | 3/2002 |

OTHER PUBLICATIONS

Japanese Office Action issued Nov. 27, 2007 in Japanese Application No. 2002-254164.
Japanese Office Action issued May 28, 2007 in Japanese Application No. 2002-254164.
Notification of Reasons for Refusal in Japanese Application No. 2002-254164.

* cited by examiner

*Primary Examiner*—Yon Couso
(74) *Attorney, Agent, or Firm*—Staas & Halsey LLP

(57) ABSTRACT

An image encoding apparatus comprises an image input unit 12 for entering image data, a block split unit 14 for splitting the entered image data into a plurality of blocks, a block extractor unit 16 and an averaging unit 18, both of which act as a value acquisition unit for acquiring a certain value from the split block image, and a code generation unit 20 for generating a code based on the acquired value of the block image.

17 Claims, 14 Drawing Sheets

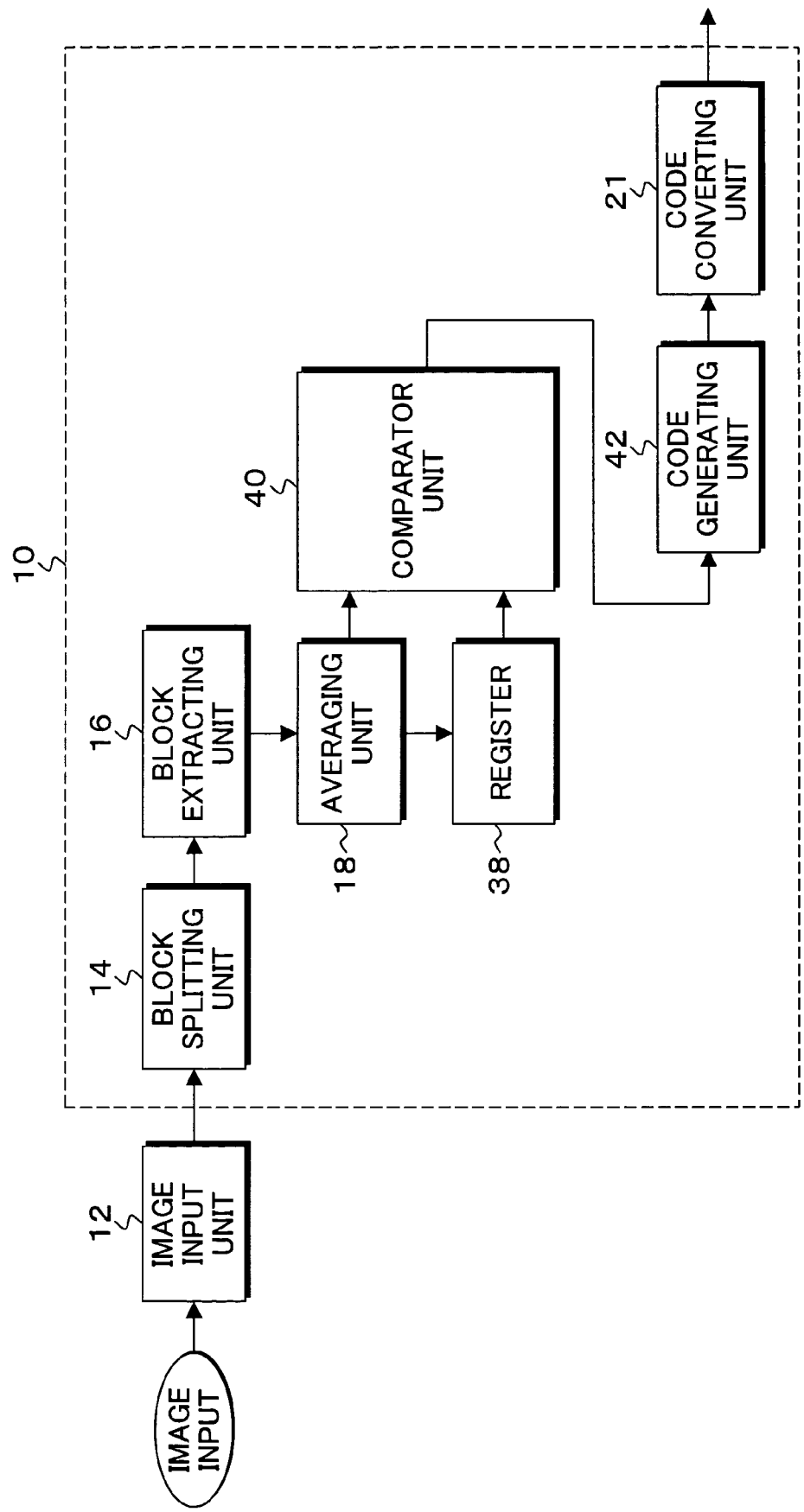

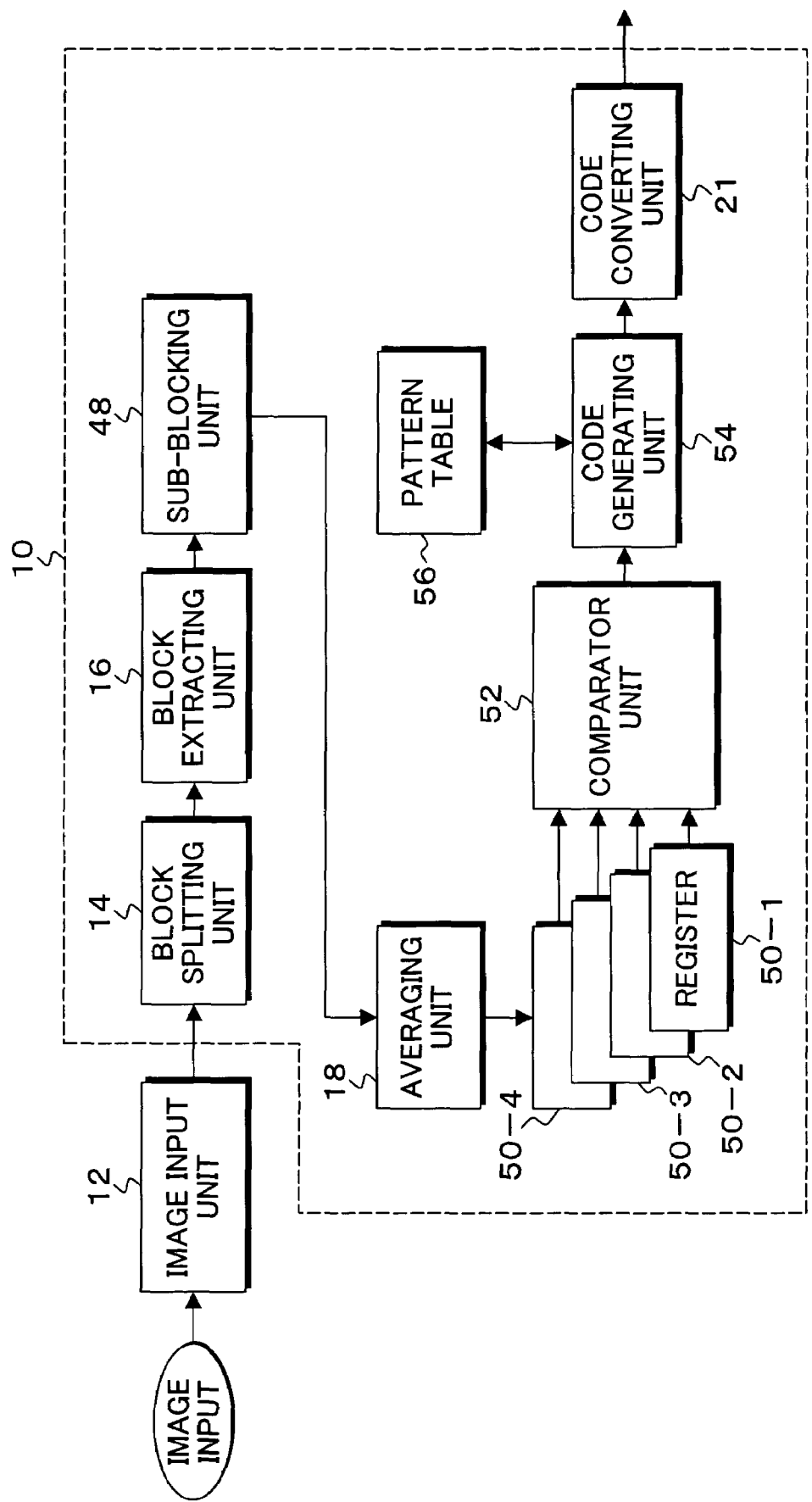

IMAGE ENCODING APPARATUS, METHOD AND PROGRAM

BACKGROUND OF THE INVENTION

1. Field of the Invention

The present invention relates generally to an image encoding apparatus, method and program for encoding images entered by a device with an image input function, for example, a mobile telephone with a camera, and more particularly to an image encoding apparatus, method and program for encoding images using values of the density, chroma, etc., of the images.

2. Description of the Related Arts

Recently, with the increasing use of the Internet by mobile telephones, mobile telephones mounted with image input devices, such as cameras or scanners have been enthusiastically developed. By use of such mobile telephones, image data acquired by the image input devices can be sent for utilization from the mobile telephones to terminals such as another mobile telephone or personal computer through a communication network including the Internet.

A method for utilizing image data, in which image input devices such as scanners or cameras are connected to personal computers is disclosed, for example, in Specification and Drawings of U.S. Pat. No. 5,636,292. In this image data utilization method, image data, such as printed matters, where the information acquired by Steganographic encoding (hereinafter referred to as "stegano data") is embedded, is read from the image input devices into personal computers for detecting stegano data.

However, in most cases, the way of embedding information like stegano data in images is a digital watermarking technology for security, like forgery prevention or abuse prevention, and even if the original data is deformed or partially used, the embedded information must stand such abuses without being broken. For this purpose, very complex methods had to be employed, such as the methods, in which the same data is dispersedly embedded within the image, or in which the data is inserted within a frequency area.

Recently, however, this digital watermarking technology is being used for a variety of value added services. For example, Specification and Drawings of U.S. Pat. No. 5,636,292 disclose a method, wherein stegano data, digital watermarking data, embedded in printed matters is read by the personal computer, the read stegano data being sent to a server for acquiring a URL, such that a specific web page is displayed.

However, the processing of entering images and reading digital watermarking data takes a relatively large amount of calculation. For this reason, even if the mobile telephone with a camera tries to read digital watermarking data to provide a service corresponding to the image, the mobile telephone cannot execute such a service in practical processing time due to the restricted processing performance of memory or a CPU that can be used in the mobile telephones.

SUMMARY OF THE INVENTION

It is therefore an object of the present invention to provide an image encoding apparatus, method and program enabling even the devices such as mobile telephones having restricted performances to encode images with simple processing.

According to a first aspect of the present invention there is provided an image encoding apparatus comprising an image input unit for entering image data; a split unit for splitting the entered image data into a plurality of blocks; a value acquisition unit for acquiring a certain value from the split block image; and a code generation unit for generating a code based on the acquired value of the block image.

As described, according to the present invention, images can be encoded by a simple processing, through the generation of codes depending on the magnitude of the value for each of the blocks splitting the image.

The code generation unit generates a code by the comparison of the predefined threshold value and the acquired value of a specific block image within the image. Also, the code generation unit generates a code by the comparison of the acquired value of a specific block image within the image and the acquired value of another block image.

The code generation unit generates a code by the positional relation of the acquired values of adjacent blocks. For example, the split unit further splits the block image into a plurality of sub-blocks, and the value acquisition unit acquires a certain value for each sub-block image. Then the code generation unit generates a code from the positional relation of the acquired values of sub-block images within the block image.

In this case, the code generation unit, for example, detects paired sub-blocks having a minimum difference from the acquired values of the sub-block images within the block image, and generates a code of the block image from the positional relation of the two sub-blocks detected.

An image can be encoded by a simple processing, without relying on the values of the image as a whole, by encoding the image depending on the relative magnitude or positional relation of each sub-block-to-sub-block, after the block is split into a plurality of sub-blocks.

An image encoding apparatus according to the present invention uses part of the entered image to encode the image by the split unit, value acquisition unit and code generation unit. By use of part of the image, but not the entire image, as described above, the amount of calculation can be reduced.

The acquisition unit acquires the average density, granularity, chroma or the center of gravity of density as the values of the block image.

The image encoding apparatus according to the present invention is further characterized in that a data conversion unit is provided for converting the image code generated by the code generation unit to another data using a conversion table. Because of this, the code generated from the image can be converted to a URL, or the address of a specific web page by the conversion table, such that the user can enjoy services corresponding to the image.

According to a second aspect of the present invention there is provided an image encoding method comprising:

an image input step for entering image data;

a split step for splitting the entered image data into a plurality of blocks;

a value acquisition step for acquiring a certain value from the split block image; and a code generation step for generating a code based on the acquired value of the block image.

According to a third aspect of the present invention there is provided a program for image encoding allowing a computer for use in e.g., mobile telephones to execute:

an image input step for entering image data;

a split step for splitting the entered image data into a plurality of blocks;

a value acquisition step for acquiring a certain value from the split block image; and a code generation step for generating a code based on the acquired value of the block image. Details of the image encoding method and program will become substantially the same as those of the image encoding apparatus.

The above and other objects, aspects, features and advantages of the present invention will become more apparent from the following detailed description when taken in conjunction with the accompanying drawings.

BRIEF DESCRIPTION OF THE DRAWINGS

FIG. 5 is a block diagram of a second embodiment according to the present invention;

FIG. 8 is a block diagram of a third embodiment according to the present invention;

DESCRIPTION OF THE PREFERRED EMBODIMENTS

Figure 1:
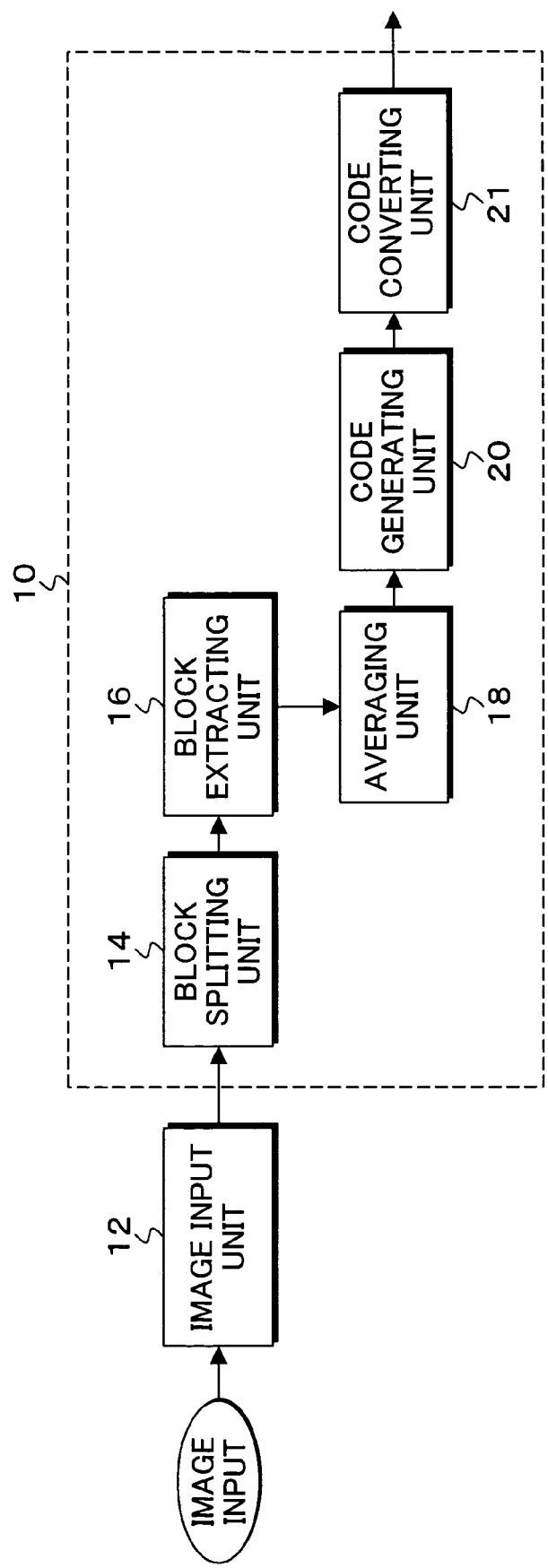
FIG. 1 is a block diagram of a first embodiment according to the present invention.

FIG. 1 is a block diagram of a functional configuration for an image encoding apparatus in a first embodiment according to the present invention. In FIG. 1, the image encoding apparatus according to the present invention comprises an image encoding processor unit 10 and an image input unit 12.

In the image encoding processor 10, a block split unit 14, a block extractor unit 16, an averaging unit 18, a code generation unit 20, and a code converter unit 21 are provided. The image input unit 12 takes a picture of the image to be encoded by a CMOS sensor or a CCD sensor, and enters the image data.

Figure 2:
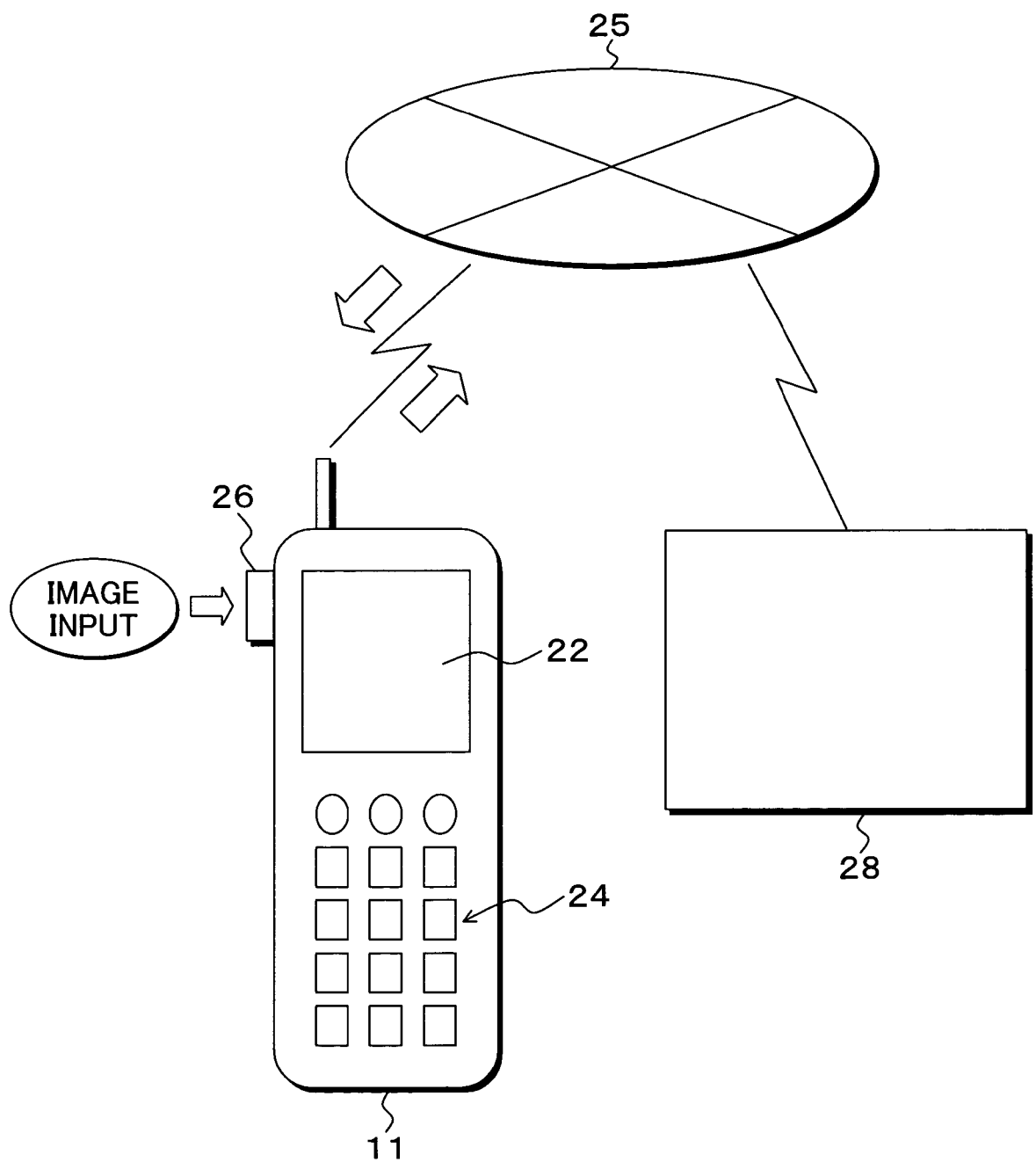
FIG. 2 is a diagram for describing a mode of utilization according to the present invention.

FIG. 2 shows a utilization embodiment when the image encoding apparatus according to the present invention is applied to mobile telephones. In a mobile telephone 11, a camera 26 is provided, in addition to a display unit that can display in colors, and a key operation unit 24. A function as the image input unit 12 shown in FIG. 1 is provided on the camera 26, and the camera takes a picture of the image to be encoded and enters the image through the CMOS sensor or CCD sensor.

A computer implemented by a DSP or PCU incorporated in the mobile telephone 11 executes processing of the image encoding apparatus 10 shown in FIG. 1. The code generated by the image encoding processor 10 is further converted to an address, for example, a URL corresponding to the image, such that the user can utilize a web page corresponding to the image, using the URL corresponding to the image, and gaining access to the server 28 through the communication network 25.

Figures 3A, 3B, 3C, 3D:
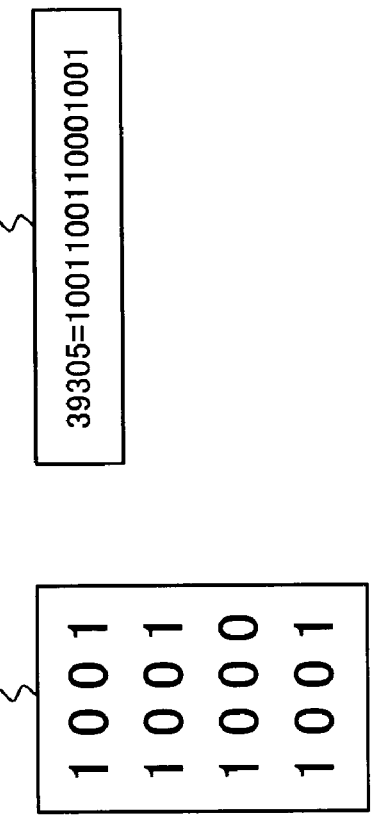
FIG. 3 is a diagram for describing the contents of conversion from an image to a code in the embodiment shown in FIG. 1.
Figure 4:
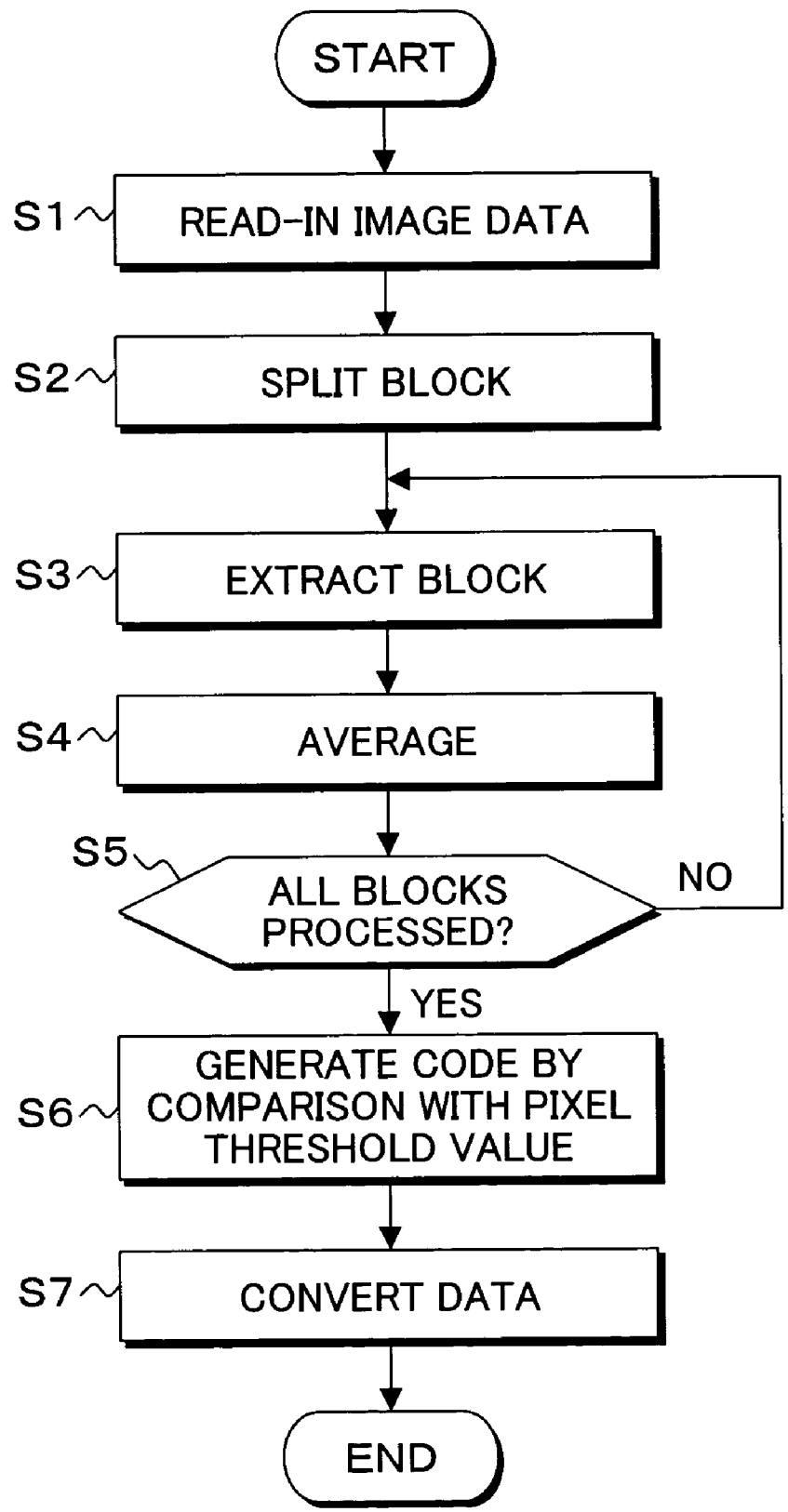
FIG. 4 is a flow chart of image encoding processing in the embodiment shown in FIG. 1.

FIG. 3 is a diagram showing the contents of processing from inputting an image to generating a code in the embodiment shown in FIG. 1, and FIG. 4 is a flow chart of image encoding processing in the embodiment shown in FIG. 1. Here, according to the flow-chart shown in FIG. 4, and referring to FIG. 3, processing operations in the embodiment shown in FIG. 1 are described as follows.

In FIG. 4, first at step S1, the image input unit 12 reads an image data. Here, the entered image 30 shown in FIG. 3(A) is a gray-scale image with 1024×1024 dots, and 256 levels of gray.

The image data photographed and entered by the CMOS sensor or CCD sensor in the image input unit 12 is split, for example, into 16 blocks of 4×4 by a block split unit 14, at the next step S2. The size of each split block is 256×256 dots.

Then, at step S3, a block extractor unit 16 separates the split blocks, and the separated blocks are extracted as a single image of 256×256 dots. Then, the extracted image is sent to an averaging unit 18 at step S4. The averaging unit 18 finds the average of the picture element values of the block image. Next, processing goes on to step S5, and all blocks are checked to see whether processing is finished or not, and if any block is not yet processed, processing goes back to step S3, and next block image is extracted. Then, processing for finding the mean value of the picture element values is repeated similarly.

FIG. 3(B) shows an example of the averaged block image 32 expressed by the averaged picture element value. Next at step S6, the code generation unit 20 executes processing for converting each block to a code bit by the comparison of the averaged picture element value of each block, and the pre-defined picture element threshold value, for example, 128 levels of gray, and generating a code.

In short, if the averaged picture element value of the block is smaller than the picture element threshold value 128, bit 0, or if larger, bit 1 are generated, respectively. FIG. 3(C) shows generated code distribution 34 of bit codes for 16 blocks generated by the large or small comparison of the averaged picture element value of each block in the averaged block image shown in FIG. 3(B) and the picture element threshold value 128.

When the generated code distribution 34 thus generated is read, for example, from the upper left corner along the line, and along the column, a generated code 36 as shown in FIG. 3(D) is acquired. In this generated code 36, octal code of "39305" is shown on the left side, and binary code of 16 bits is shown on the right side.

Once the image code is generated at step S6, at step S7, the code converter unit 21 converts the image code to an address, or a URL for providing a web page corresponding to the image, for example, by the reference to a pre-defined table.

If the URL corresponding to the image can be acquired, by the operation of the application utilizing this coded image as an input, for example, the user can, from the mobile telephone, gain access to the server 28 which provides the web page corresponding to the entered image, and use.

FIG. 5 is a block diagram of a functional configuration for an image encoding apparatus in a second embodiment according to the present invention. This second embodiment is characterized in that encoding is performed based on the comparison between the block at the upper left corner of the image that split into blocks and another block, with the mean value of the block at the upper left corner as a standard.

In FIG. 5, the image encoding apparatus in this embodiment comprises an image encoding processor 10 and an image input unit 12. In the image encoding processor 10, a block split unit 14, a block extractor unit 16, an averaging unit 18, a register 38, a comparator unit 40, a code generation unit 42, and a code converter unit 21 are provided.

Figure 6D:
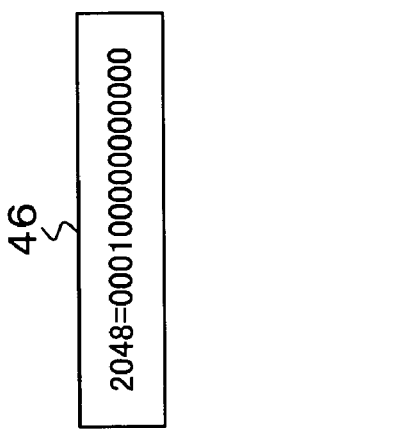
FIG. 6 is a diagram for describing the contents of conversion from an image to a code according to the embodiment shown in FIG. 5.
Figure 6C:
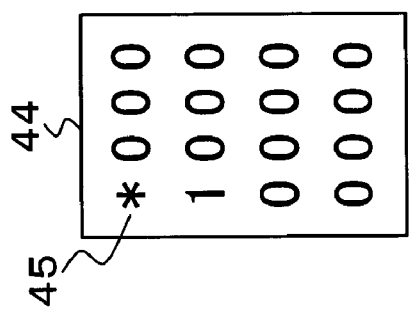
Figure 6B:
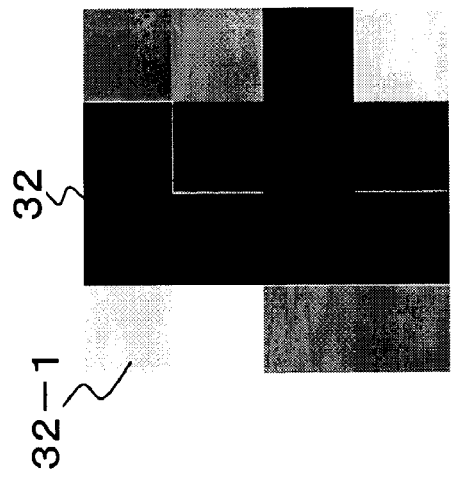
Figure 6A:
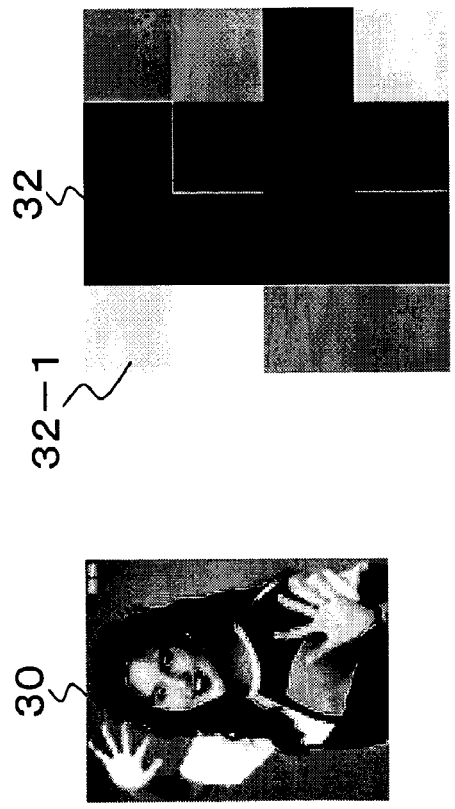
Figure 7:
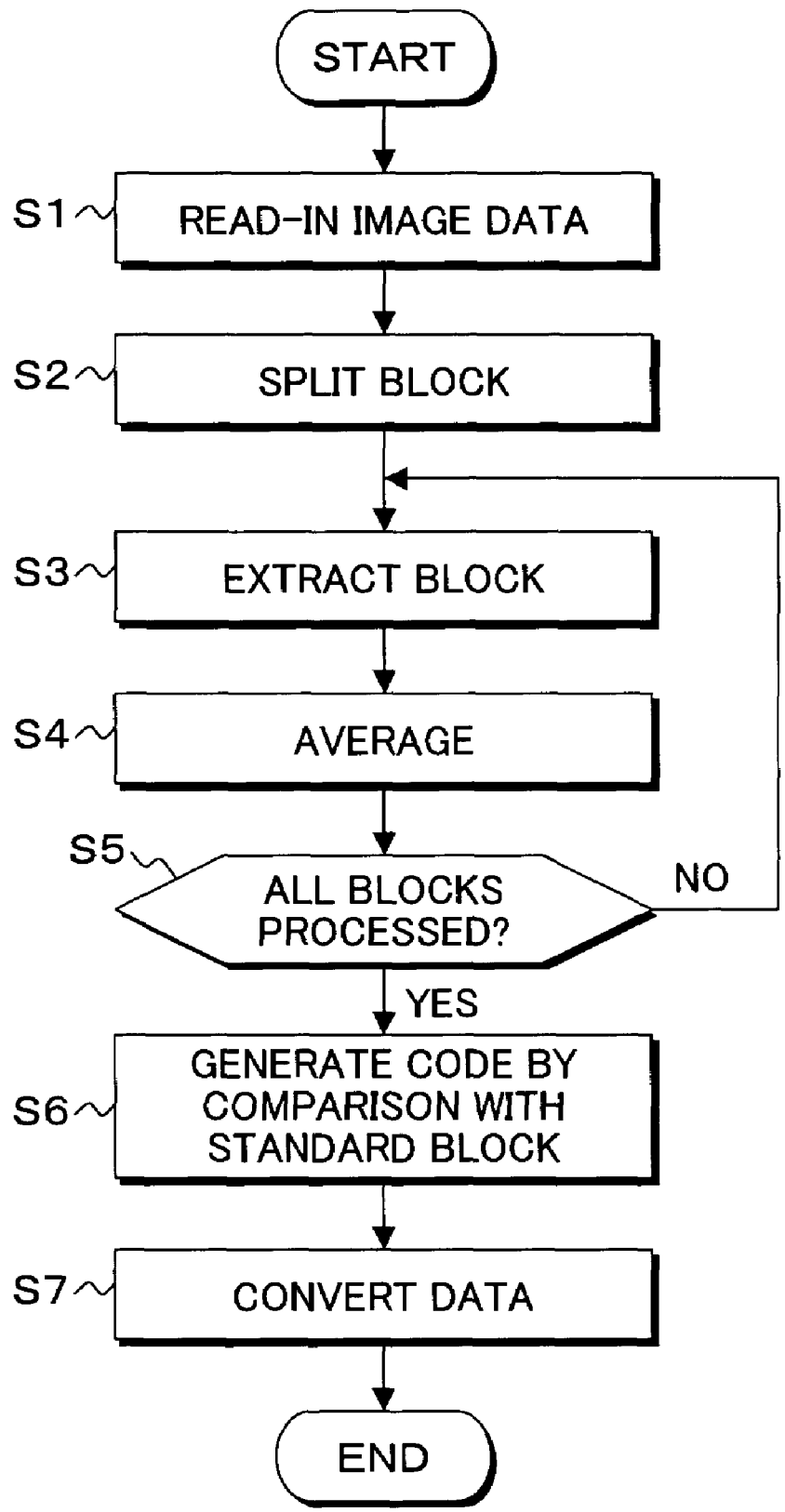
FIG. 7 is a flow chart of image encoding processing according to the embodiment shown in FIG. 5.

FIG. 6 is a diagram for describing the contents of conversion from entering an image to encoding in the second embodiment shown in FIG. 5, and FIG. 7 is a flow chart of processing operations in the embodiment shown in FIG. 5. Here, as to the flow chart shown in FIG. 7, referring to the contents of conversion shown in FIG. 6, processing operations in the embodiment shown in FIG. 5 are described as follows.

First at step S1, the image input unit 12 enters the input image 30 as the image data, for example, as shown in FIG. 6(A), which is photographed by the CMOS sensor or CCD sensor of the image input unit 12. This input image 30 is a gray-scale image of 256 levels of gray, the size of which is 1024×1024 dots.

The entered image data is split into 16 blocks having appropriate sizes, for example, 4×4, by the block split unit 16 at step S2. In this case, the sizes of each split block are 256×256 dots.

Next at step S3, the block extractor unit 16 extracts the split block image, and the extracted block image is sent to the averaging unit 18 as the image having the units of 256×256 dots, for finding the average of the picture element values at step S4. Next at step S5, all blocks are checked whether processing is finished or not, and if any block has not been processed, processing returns to step S3, and similar processing is repeated.

If all blocks have been processed at step S5, processing goes to step S6, and a code is generated by the comparison of a block and the average of the picture element value of the predefined standard block located at the upper left corner. The averaging unit 18, register 38, comparator unit 40 and code generation unit 42 shown in FIG. 5 perform the generation of code.

The result of each averaged block by the averaging unit 18 becomes the averaged block image 32 as shown in FIG. 6(B). Since the block 32-1 of the upper left corner in the averaged block image 32 is set as a standard block, the average of the picture element values acquired for the standard block 32-1 is outputted to the register 38, such that the comparator unit 40 uses the outputted value as the picture element threshold value.

The comparator unit 40 compares the averaged picture element value of the standard block 32-1 outputted from the register 38, and the averaged picture element value of the remaining blocks outputted from the averaging unit 18, and if the latter is smaller than the picture element threshold value, in short, the average of the standard block, code bit 0 is generated, or if larger, code bit 1 is generated.

By the generation of such code bits, the generated code distribution 44 as shown in FIG. 6(C) is acquired. Of this distribution, the standard block 32-1 at the upper left corner is excluded from encoding like an asterisk 45, since the value of this standard block is used as the picture element threshold value for comparison, and the conversion to bit codes is performed for the remaining 15 blocks.

In the generated code distribution C shown in FIG. 6(C), by the operation of the converted bits along the line and along the column, binary code of 15 bits is shown on the right side of the generated code 46 shown in FIG. 6(D), and this binary code is expressed by octal code "2048" shown on the left side.

Furthermore at step S7, the generated code is converted to the URL, or the address of, for example, a web page, by the reference to the predefined table, and outputted.

FIG. 8 is a block diagram of a functional configuration for an image encoding apparatus in a third embodiment according to the present invention. The third embodiment is characterized in that encoding is performed depending on the positional relation of the density difference of adjacent blocks.

In FIG. 8, the image encoding apparatus in this embodiment comprises an image encoding processor unit 10 and an image input unit 12. To the image encoding processor unit 10, a block split unit 14, a block extractor unit 16, a sub-block forming unit 48, an averaging unit 18, registers 50-1-50-4, a comparator unit 52, a code generation unit 54, a pattern table 56, and a code converter unit 21 are provided.

Figure 9A:
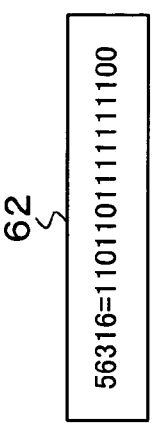
FIG. 9 is a diagram for describing the contents of conversion from an image to a code according to the embodiment shown in FIG. 8.

FIG. 9 shows the contents of conversion up to encoding of the entered image in an embodiment shown in FIG. 8, and registration pattern of a pattern table 56. Furthermore, FIG. 10 is a flow chart of processing operations in a third embodiment shown in FIG. 8. Here, referring to FIG. 9, processing operations in the flow chart shown in FIG. 10 in an embodiment shown in FIG. 8 are described as follows.

Now, the image to be processed is supposed to be a gray-scale image of 256 levels of gray, having 1024×1024 dots in size. First at step S1, the image input unit 12 reads the image data. In other words, a CMOS sensor or CCD sensor provided on the image input unit 12 photographs an image, and enters the image data.

At step S2, the entered image data is split into appropriate sizes, for example, into 16 blocks of 4×4, by the block split unit 14. In this case, each split block is 256×256 dots in size.

Next at step S3, the block extractor unit 16 extracts the split block as a single image of 256×256 dots, and sends the extracted block to the sub-block forming unit 48. Like step S4, the sub-block forming unit 48 further splits one block image into 4 blocks of 2×2. This split sub-block is 128×128 dots in size.

The sub-block image split by the sub-block forming unit 18 is sent to the averaging unit 18 as a single image of 128×128, and at step 5, averaging operation is performed for four sub-blocks, which are the member components of one image block. The averaged value of each sub-block is stored in the registers 50-1-50-4, respectively.

Next at step S6, the comparator unit 52 calculates respective mutual difference in 4 sub-blocks stored in the registers 50-1-50-4, and at step S7, selects paired sub-blocks having the minimum difference.

Here, the averaged values of the picture element values of the four sub-blocks are supposed to be SB1, SB2, SB3, and SB4, respectively, in a league competition system, the number of combinations for the number N of sub-blocks can be acquired as $(N_2-N)/2$. Here, as N equals 4, the number of combination is 6. Therefore, the comparator unit 52 calculates the difference in the averaged values of 6 combinations in the four sub-blocks, and selects paired sub-blocks having the minimum difference in the 6 combinations.

At the next step S8, all blocks are checked whether processing is finished or not. If any block has not been processed, processing returns to step S3, and the next block is taken out. Then steps of sub-blocking, averaging and selecting paired sub-blocks having the minimum difference in the mean values in the four sub-blocks are repeatedly performed.

Next at step S9, the code generation unit 54 performs encoding operation while referring to the pattern table 56, and based on the result of comparison made by the comparator unit 52. Here, as shown in FIG. 9(A), patterns 56-01 through 56-03 corresponding to the code bit 0, and patterns 56-11 through 56-13 corresponding to the code bit 1 are pre-stored in the pattern table 56.

Figure 9B:
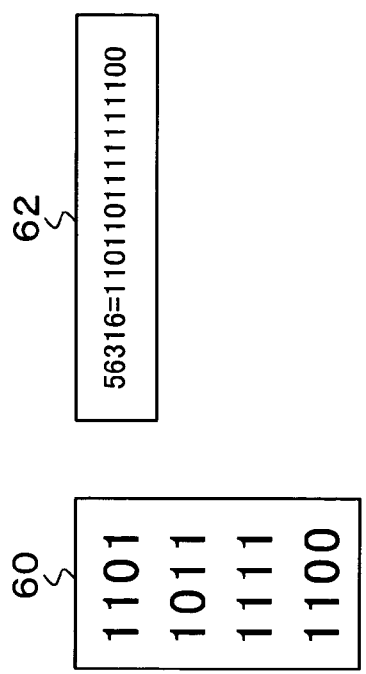
Figure 9C:
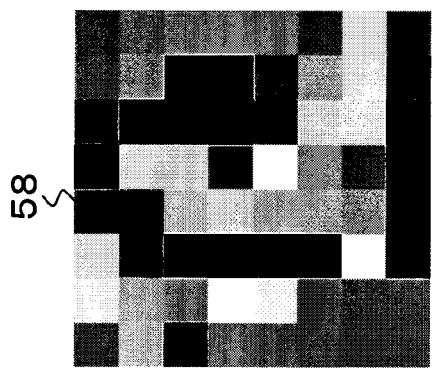
Figure 10:
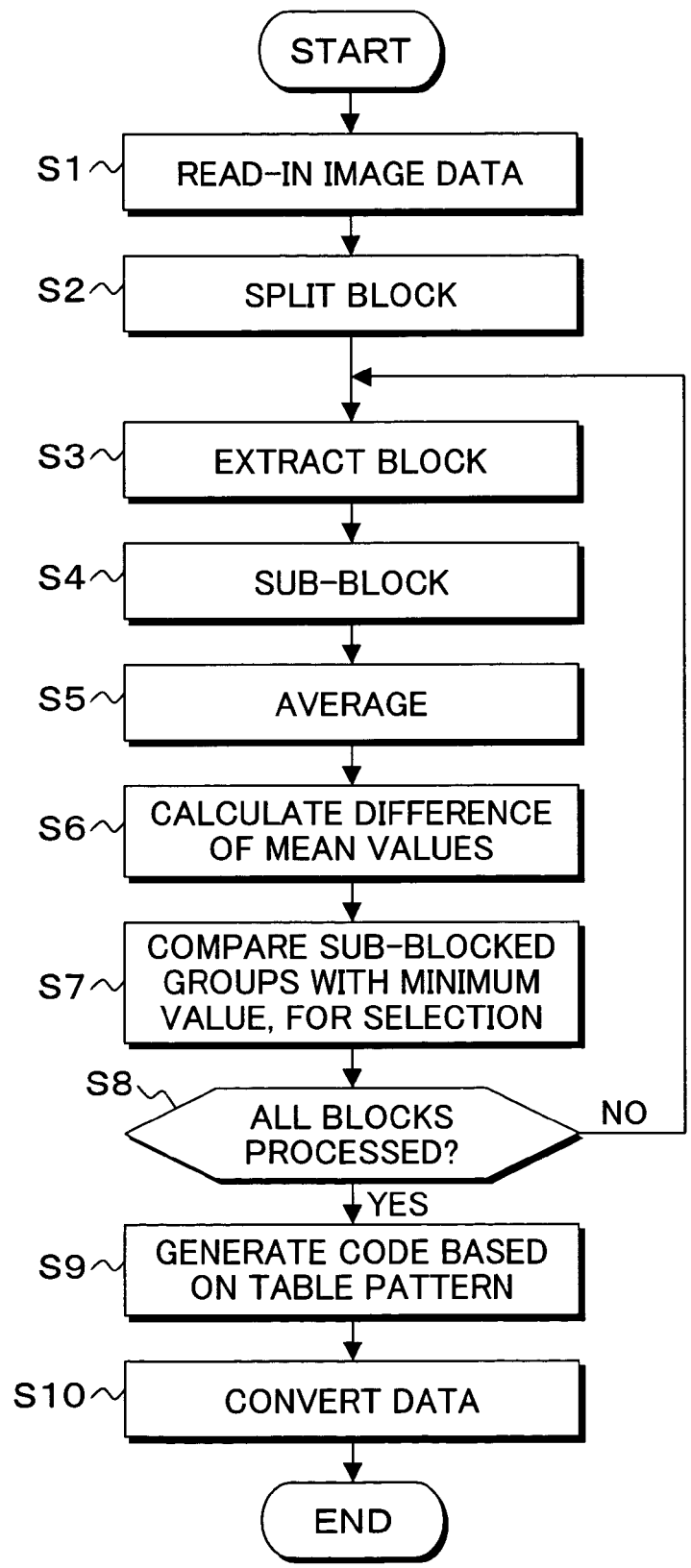
FIG. 10 is a flow chart of image encoding processing according to the embodiment shown in FIG. 8.

Therefore, in order to correspond to the pattern by the combination of two sub-blocks where the difference is the minimum in the four block images making up each block in the averaged block image 58 in the case of sub-blocked as shown in FIG. 9(B), the code bit is converted to 0 or 1, with reference to the pattern table 56, such that the generated code distribution 60 as shown in FIG. 9(C) is acquired.

Figure 9D:
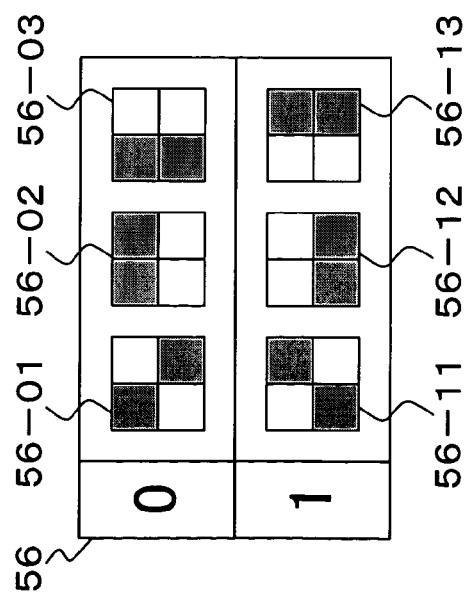

By reading-out of the generated code distribution 60, starting from the upper left corner and along the line and along the column, the generated code distribution 62 as shown in FIG. 9(D) can be acquired. In this generated code 62, octal code "56316" is shown on the left side, and binary code of 16 bits acquired from the generated code distribution 60 is shown on the right side.

Furthermore at step S10, the code generated by the code generation unit 54 is converted, for example, to the address, or the URL of a web page corresponding to the image by the code converter unit 21, and outputted, such that the user can look at the web page, using this URL.

Figure 11:
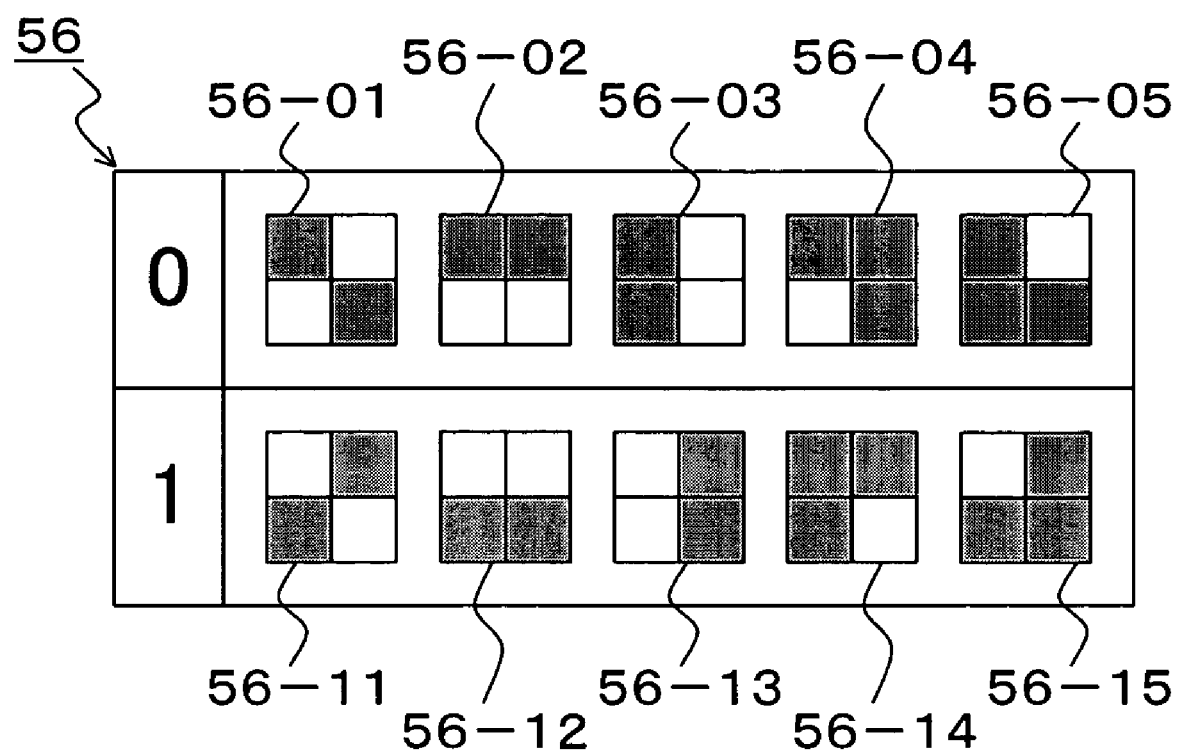
FIG. 11 is a diagram for describing another embodiment of a table pattern for use in code forming shown in FIG. 8.

FIG. 11 shows another embodiment of a pattern table to be used in image encoding shown in FIG. 8. To this pattern table 56, in addition to three patterns 56-01-56-03 and 56-11-56-13 corresponding to code bits 0 and 1 shown in FIG. 9(A), patterns 56-04 and 56-05 of the code bit 0 having the combination of three sub-blocks, and patterns 56-14 and 56-15 of the code bit 1 are added.

Such patterns of the positional relation caused by the mode difference of sub-blocks to be converted to code bit 1 or 0 can take suitable mode if necessary. Needless to say, the number of splitting sub-blocks may be increased, however, as the present invention aims at simple processing, the most preferred case in the embodiment is to split one block into 4 sub-blocks of 2×2.

Figure 12:
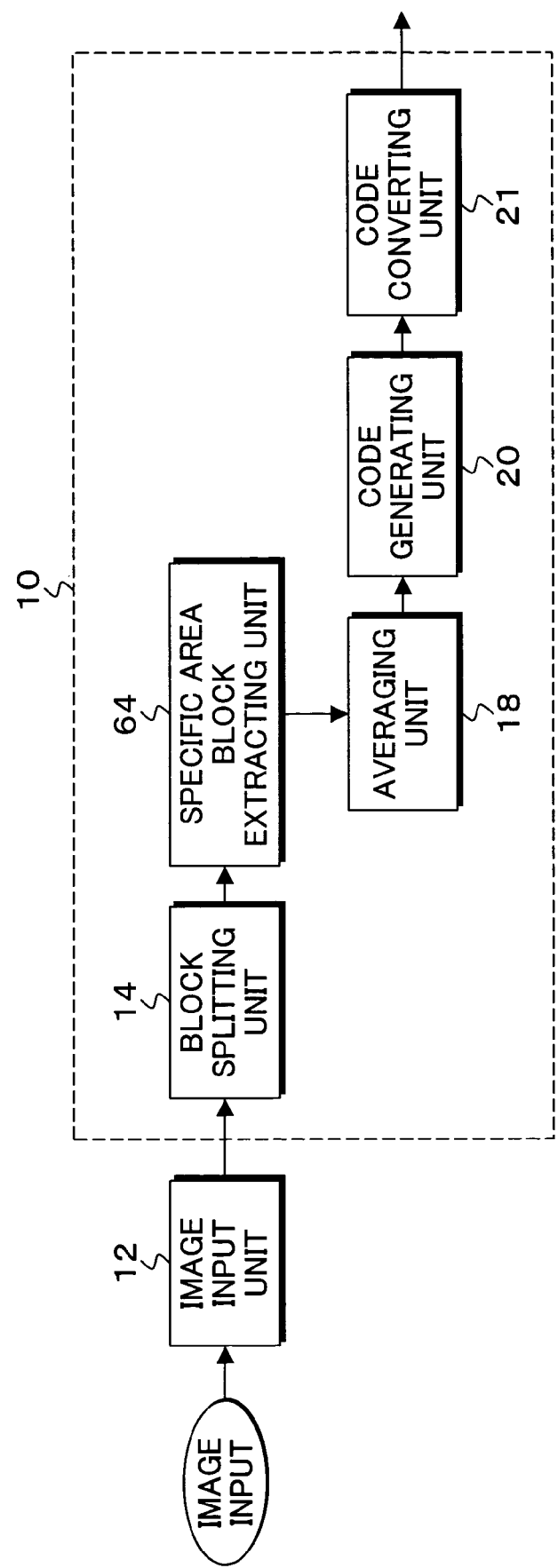
FIG. 12 is a block diagram of a fourth embodiment according to the present invention.

FIG. 12 is a block diagram of a functional configuration for an image encoding apparatus in a fourth embodiment according to the present invention. The fourth embodiment is characterized by encoding images, using part of the image, but not the total image.

In FIG. 12, an image encoding apparatus in this embodiment comprises an image encoding processor unit 10, and an image input unit 12. To the image encoding processor unit 10, a block split unit 14, a specific area block extractor unit 64, an averaging unit 18, a code generation unit 20, and a code converter unit 21 are provided.

Figure 13C:
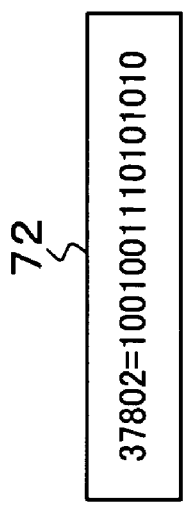
FIG. 13 is a diagram for describing the contents of conversion from an image to a code according to the embodiment shown in FIG. 12.
Figure 13B:
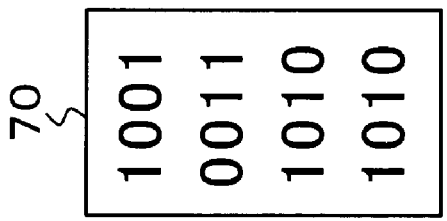
Figure 13A:
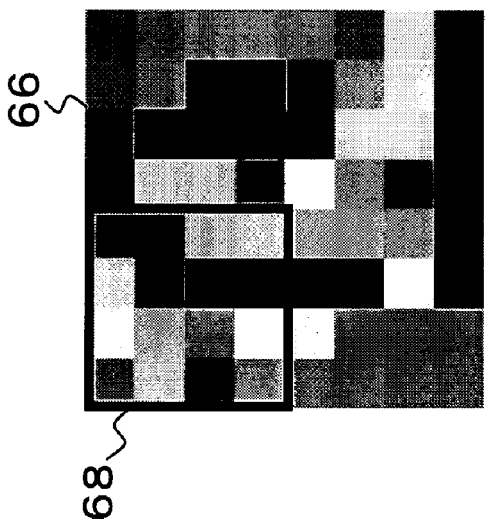
Figure 14:
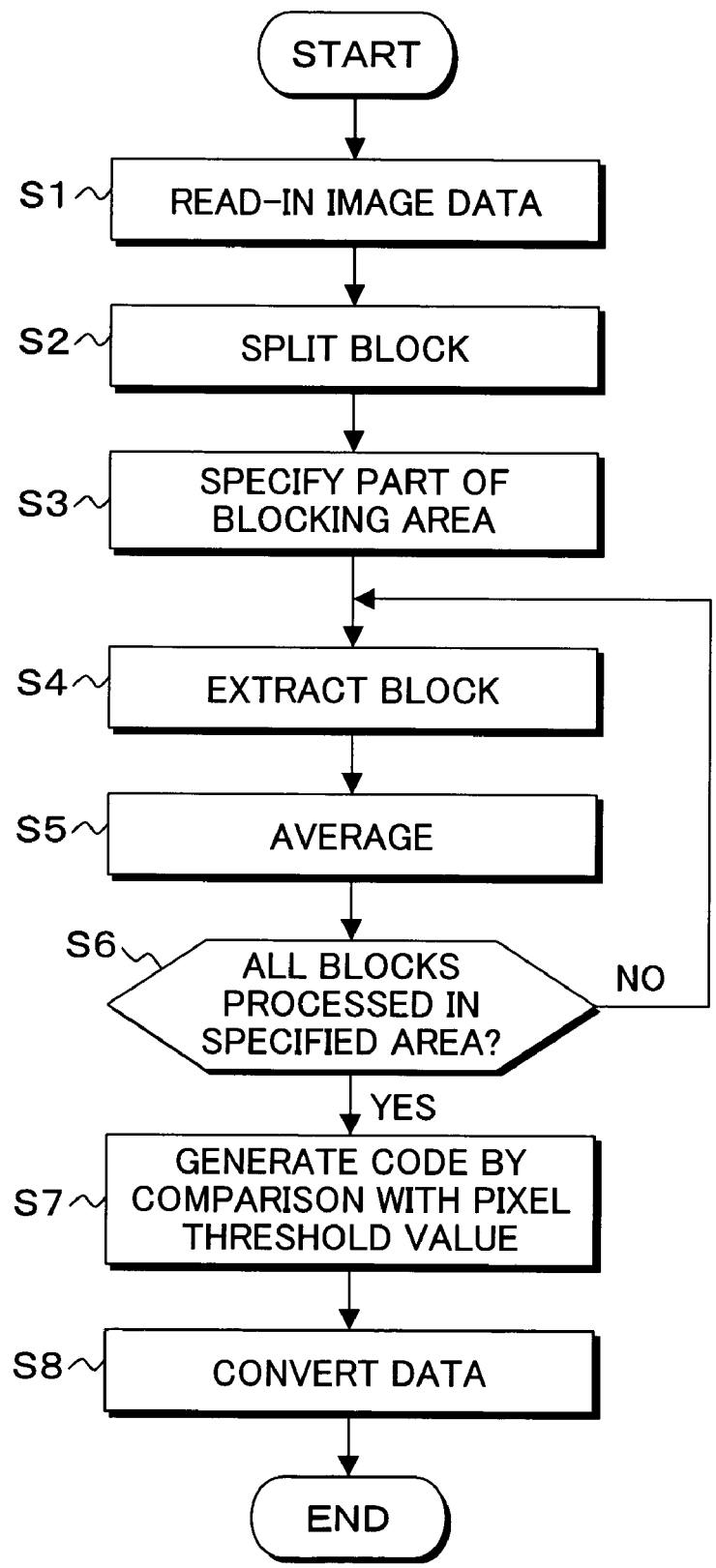
FIG. 14 is a flow chart of image encoding processing according to the embodiment shown in FIG. 12.

FIG. 13 shows the contents of conversion from entering an image to encoding in an embodiment shown in FIG. 12, and FIG. 14 is a flow chart of processing operations in an embodiment shown in FIG. 12.

Referring to FIG. 13, processing operations in an embodiment shown in FIG. 12 with respect to the flow chart shown in FIG. 14 are described as follows.

Now, the image to be processed is supposed to be a grayscale image with 256 levels of gray, and 1024×1024 dots in size. First at step S1, the image input unit 12 enters the image data photographed by the CMOS sensor or CCD sensor, and gives to the block split unit 14. Then at step S2, the block split unit splits the received image data into 64 blocks having appropriate sizes, for example, in this case, 8×8. In this case, the sizes of each split block are 128×128 dots.

Then at step S3, the specific area block extractor unit 64 extracts only the block area 68, that is the 4×4 block at the upper left corner shown in FIG. 13(A), and further extracts a unit image of 128×128 dots from the block area 68 at step S4, and gives the extracted image to the averaging unit 18 for finding the average of the picture element values at step S5.

Next at step S6, steps S4 and S5 of extracting and averaging a block are repeatedly performed until processing of all blocks in a specified area is finished. When processing of all blocks in a specific area is finished, at step S7, the code generation unit 20 averages the average picture element value of each block in the block area to a code bit, by the comparison with the predefined picture element threshold value 128.

In short, if the average of the picture element value of each block is smaller than the picture element threshold value 128, code bit 0 is generated, or if larger, code bit 1 is generated. By generating of bit codes, the generated code distribution 70 shown in FIG. 13(B) is acquired. By reading-out of this distribution, starting from the upper right corner and along the line and column, the generated code 72 as shown in FIG. 13(C) is acquired.

In the generated code 72, octal code "37802" is shown on the left side, and binary code acquired from the generated code distribution 70 is shown on the right side. Furthermore at step S8, the generated code is converted to the URL, address, by the data conversion unit 21, for gaining access to a web page corresponding to the image, and outputted.

In the above embodiment, in order to acquire a specific encoded value of an image, the average of the picture element value of each block or sub-block is used, in short, the mean value of the density is used, however, the present invention is not limited to such values, but whichever value can be used, if the values can be acquired from the blocked or sub-block image, such as the granularity of the image, chroma, center of gravity of density, distribution, etc.

Also, in the above embodiment, the code converter unit converts the generated code to the URL, or the address of a web page, however, the generated code may be converted to any suitable data corresponding to the image, other than the URL. Also, the conversion from the generated code to other data may be performed by, for example, a mobile telephone or other devices employing the present invention, or converting operation may use the external database.

Also, in the above embodiment, the code converter unit 21 is provided following the code generation unit, however, a basic configuration according to the present invention requires only the code generation unit 20 alone to be provided, and the code converter unit 21 can be said to be an additional configuration.

The present invention is not limited to the above embodiments of steps adapted to split blocks, split sub-blocks, or to process values of sub-blocks and code, but any appropriate embodiments can be taken.

The fourth embodiment shown in FIG. 12 cites the case as an example, where the code generation unit 20 performs encoding by the comparison with the fixed threshold value shown in FIG. 1, however, the present invention is not limited to this encoding method, and like the second embodiment shown in FIG. 5 and the third embodiment shown in FIG. 8, a partial area of an image may be encoded.

In addition, the present invention covers any appropriate modifications without impairing the objects and advantages thereof and is not restricted by numerical values indicated in the above embodiments.

As set forth hereinabove, according to the present invention, by the generation of a code corresponding to the magnitude of the value of each split block of the image, a code intrinsic to the entered image can be generated and allocated to the entered image simply and easily with a small amount of calculation, even if the task is image processing. Even devices such as mobile telephones having restricted processing performances can generate and use a code corresponding to the image in the practical processing time.

What is claimed is:

1. An image encoding apparatus comprising:
   an image input unit for entering image data;
   a split unit for splitting the entered image data into a plurality of blocks;
   a value acquisition unit for acquiring a certain value from the split block image;
   a code generation unit for generating a code based on the acquired value of the block; and
   a data conversion unit for converting the image code generated by the code generation unit into other data, using a conversion table.

2. The image encoding apparatus according to claim 1, wherein the code generation unit generates a code by comparing a predefined threshold value and the acquired value of a specific block image within the image.

3. The image encoding apparatus according to claim 1, wherein the code generation unit generates a code by comparing the acquired value of a specific block image within the image and the acquired value of another block image.

4. The image encoding apparatus according to claim 1, wherein the code generation unit generates a code depending on the positional relation between the acquired values of neighboring blocks.

5. The image encoding apparatus according to claim 1, wherein the split unit further splits the block image into a plurality of sub-blocks, and wherein the value acquisition unit acquires a certain value for each sub-block image, and wherein the code generation unit generates a code from the positional relation between the acquired values of the sub-block images within the block image.

6. The image encoding apparatus according to claim 5, wherein the code generation unit detects a pair of sub-block having a minimum difference from the acquired values of the sub-block images within the block image, the code generation unit generating a code of the block image from the positional relation between the pair of sub-blocks detected.

7. The image encoding apparatus according to claim 1, wherein the image is encoded by the split unit, the value acquisition unit and the code generation unit, using part of the image entered.

8. The image encoding apparatus according to claim 1, wherein the value acquisition unit acquires as the value of the block image the average density, granularity, chroma, or center of gravity of density.

9. An image encoding method comprising:
   an image input step for entering image data;
   a split step for splitting the entered image data into a plurality of blocks;
   a value acquisition step for acquiring a certain value from the split block image;
   a code generation step for generating a code based on the acquired value of the block image; and
   data converting the image code generated by the code generation unit into other data, using a conversion table.

10. The image encoding method according to claim 9, wherein the code generation step includes generating a code by comparing a predefined threshold value and the acquired value of a specific block image within the image.

11. The image encoding method according to claim 9, wherein the code generation unit includes generating a code by comparing the acquired value of a specific block image within the image and the acquired value of another block image.

12. The image encoding method according to claim 9, wherein the code generation step includes generating a code depending on the positional relation between the acquired values of neighboring blocks.

13. The image encoding method according to claim 9, wherein the split step includes further splitting the block image into a plurality of sub-blocks, and wherein the value acquisition step includes acquiring a certain value for each sub-block image, and wherein the code generation step includes generating a code from the positional relation between the acquired values of the sub-block images within the block image.

14. The image encoding method according to claim 13, wherein the code generation step includes detecting a pair of sub-block having a minimum difference from the acquired values of the sub-block images within the block image, the code generation step including generating a code of the block image from the positional relation between the pair of sub-blocks detected.

15. The image encoding method according to claim 9, wherein the image is encoded by the split step, the value acquisition step and the code generation step, using part of the image entered.

16. The image encoding method according to claim 9, wherein the value acquisition step includes acquiring as the value of the block image the average density, granularity, chroma, or center of gravity of density.

17. A computer readable storage medium which stores a program allowing a computer to execute:
   an image input step for entering image data;
   a split step for splitting the entered image data into a plurality of blocks;
   a value acquisition step for acquiring a certain value from the split block image;
   a code generation step for generating a code based on the acquired value of the block image; and
   data converting, by a computer, the image code generated by the code generation unit into other data, using a conversion table.

* * * * *

UNITED STATES PATENT AND TRADEMARK OFFICE
CERTIFICATE OF CORRECTION

PATENT NO. : 7,430,326 B2 Page 1 of 1
APPLICATION NO. : 10/642142
DATED : September 30, 2008
INVENTOR(S) : Jun Moroo et al.

It is certified that error appears in the above-identified patent and that said Letters Patent is hereby corrected as shown below:

Column 9, Line 11, change "block;" to --block image;--.

Signed and Sealed this

Ninth Day of December, 2008

JON W. DUDAS
*Director of the United States Patent and Trademark Office*